United States Patent
Guo

(12) 
(10) Patent No.: US 9,342,740 B1
(45) Date of Patent: May 17, 2016

(54) IDENTIFYING A PORTION OF AN IMAGE WITHOUT CONTENT BASED ON A MEASURE OF DIVERSITY OF PIXELS IN THE PORTION

(71) Applicant: Flipboard, Inc., Palo Alto, CA (US)

(72) Inventor: Meng Guo, San Jose, CA (US)

(73) Assignee: Flipboard, Inc., Palo Alto, CA (US)

( * ) Notice: Subject to any disclaimer, the term of this patent is extended or adjusted under 35 U.S.C. 154(b) by 0 days.

(21) Appl. No.: 14/571,143

(22) Filed: Dec. 15, 2014

(51) Int. Cl.
*G06K 9/00* (2006.01)
*G06K 9/34* (2006.01)
*G06T 7/00* (2006.01)

(52) U.S. Cl.
CPC .......... *G06K 9/00442* (2013.01); *G06T 7/0081* (2013.01); *G06T 2207/10024* (2013.01); *G06T 2207/20148* (2013.01)

(58) Field of Classification Search
CPC .. G06K 9/4604; G06K 9/4652; G06T 7/0081; G06T 2207/20021; G06F 17/30244
USPC .................................................. 382/164–165
See application file for complete search history.

(56) References Cited

U.S. PATENT DOCUMENTS

| 7,936,377 B2 * | 5/2011 | Friedhoff ............... H04N 9/045 348/222.1 |
| 8,805,110 B2 * | 8/2014 | Rhoads ......................... 382/255 |
| 2013/0024757 A1 | 1/2013 | Doll et al. |
| 2014/0074863 A1 | 3/2014 | Walkingshaw et al. |

* cited by examiner

*Primary Examiner* — Kanjibhai Patel
(74) *Attorney, Agent, or Firm* — Fenwick & West LLP

(57) ABSTRACT

A digital magazine server detects a portion of an image including pixels having similar or matching color values. Values are identified for pixels within the portion based on color values of the pixels and a measure of diversity of color is determined based on the identified values. The measure of color diversity is compared to a threshold value, and if the measure of diversity does not exceed the threshold value, the digital magazine server stores information indicating the portion does not include content. The digital magazine server may also identify an additional portion within a threshold distance of the portion if the portion does not include content and determine whether the additional portion includes pixels having matching or similar color values.

20 Claims, 3 Drawing Sheets

IDENTIFYING A PORTION OF AN IMAGE WITHOUT CONTENT BASED ON A MEASURE OF DIVERSITY OF PIXELS IN THE PORTION

BACKGROUND

This invention relates generally to image analysis, and more specifically to identifying a portion of an image that does not include content.

A digital magazine server provides content to its users via a digital magazine having various pages each including one or more content items. Each page also includes information describing positioning of content items within a page relative to each other. Frequently, content included in a digital magazine includes images, so a page of the digital magazine often includes multiple images.

However, images included in a page of the digital magazine may include content as well as portions without content, such as a letterbox region of a frame captured from a video. Conventional instructions for presenting images in a page of digital content do not account for portions of an image that do not include content, which may cause the content included in the image to appear distorted or difficult to view when the image is presented to a user. For example, if content in an image is surrounded by a border that does not include content, a difference in the area including the content and the total area of the image may cause the content in the image to be distorted when the image is presented by the page of the digital magazine.

SUMMARY

A digital magazine server retrieves content from one or more sources and generates a personalized, customizable digital magazine for a user based on the retrieved content. The digital magazine server organizes content items having at least one common characteristic into various sections based on page templates describing the relative positioning of content items to each other. Content items are presented to the user according to the sections. The retrieved content items may be associated with images or include images, and the digital magazine server may identify portions of an image without content to improve presentation of the image via the digital magazine.

When selecting content for inclusion in a digital magazine, the digital magazine server obtains an image that includes a set of pixels. For example, the digital magazine server obtains an image from a source, from another user of the digital magazine server, or from the digital magazine server. A color model represents the image by associating one or more color components each specifying a color and color values specifying an intensity of the one or more colors specified by the color components with each pixel in the image. Example color models include: red-green-blue (RGB), cyan-magenta-yellow-black (CMYK), International Commission on Illumination cone response, luminosity, and blue stimulation (CIE XYZ), hue-saturation-value (HSV), hue-saturation-lightness (HSL), or any other suitable mathematical model representing color.

Additionally, the image includes multiple borders specifying boundaries of an image. For example, the image includes borders corresponding to an upper boundary, a lower boundary, a right boundary, and a left boundary of the image. The digital magazine identifies a border of the image and identifies a portion of the image that includes one or more pixels from the set of pixels included in the image and that is within a threshold distance from the border of the image. In some embodiments, the distance from the identified border is a number of pixels from the border, a number of pixels from the border at a specified angle, a number of pixels from the border in a specified direction, or any other suitable distance from the border. However, a portion of the image within a threshold distance of an edge included in the image, from a feature included in the image (e.g., an object, text, etc.), or from any suitable characteristic of the image may be identified in some embodiments.

Values identifying one or more colors associated with the pixels included in the portion are identified by the digital magazine server. In one embodiment, a value identifying a color associated with a pixel in the portion is based on color components and color values associated with the pixel by the color model associated with the image. Alternatively, the value identifying a color associated with a pixel in the portion may be based on the color components and the color values associated with the pixel as well as color components and color values associated with additional pixels within the portion that are within a threshold distance of the pixel. In other embodiments, the identified value is based on color components associated with the pixel and satisfies one or more criteria (e.g., less than a threshold, greater than a threshold).

Based on the values identifying colors associated with pixels within the portion, the digital magazine server determines a measure of diversity of color within the portion. The measure of diversity of color within the portion describes differences between colors associated with pixels within the portion. In one embodiment, the measure of diversity of color within the portion is an average of difference between values associated with different pairs of adjacent pixels within the portion. As another example, the measure of diversity of color is an average difference between values associated with various pixels in the portion and a baseline value. Alternatively, the measure of diversity of color is a variance of identified values associated with various pixels in the portion, differences between identified values associated with various pixels, a difference between a value based on the identified values associated with various pixels (e.g., an average of the identified values) and a threshold value, or any suitable value.

The digital magazine server determines whether the measure of diversity of color within the portion exceeds a threshold value. If the measure of diversity of color within the portion is an average difference between identified values associated with adjacent pixels within the portion, the threshold value specifies a maximum difference between identified values; hence, if the measure of diversity of color is less than the maximum difference, pixels within the portion are determined to be associated with the same color or with similar colors. In another embodiment, the measure of diversity of color is an average of the identified values for pixels in the portion and the threshold value is a color value, the digital magazine server determines whether the measure of diversity of color is within a specified amount of the threshold value. If the measure of diversity is within the specified amount of the threshold value, the digital magazine server determines the color associated with pixels within the portion matches the color value specified by the threshold value, which indicates a common color is associated with pixels in the portion.

Responsive to determining the measure of diversity of color does not exceed the threshold value, the digital magazine server stores information indicating the portion of the image does not include content and identifies an additional portion of the image within the threshold distance from the portion of the image. The additional portion is identified as described above. However, if the digital magazine server determines the measure of diversity of color exceeds the threshold value, information indicating the portion of the image includes content may be stored in association with the image.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
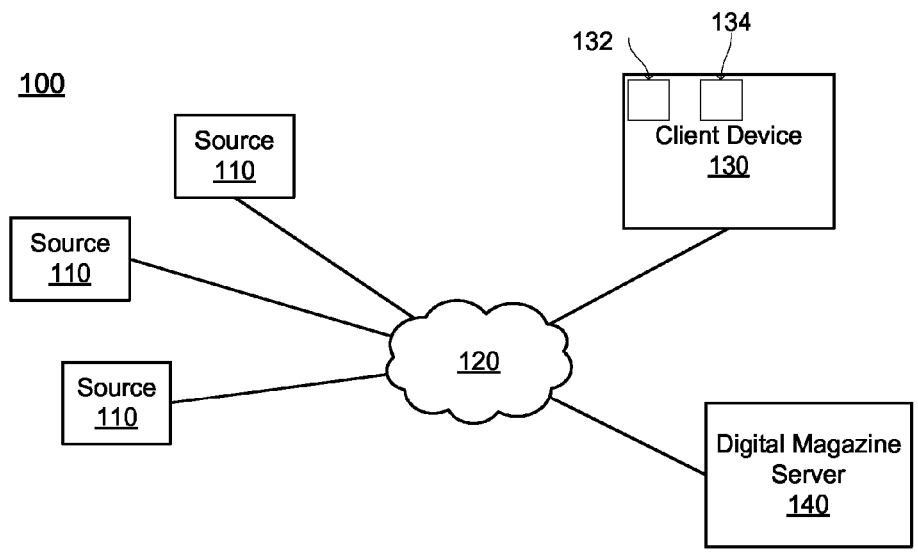
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
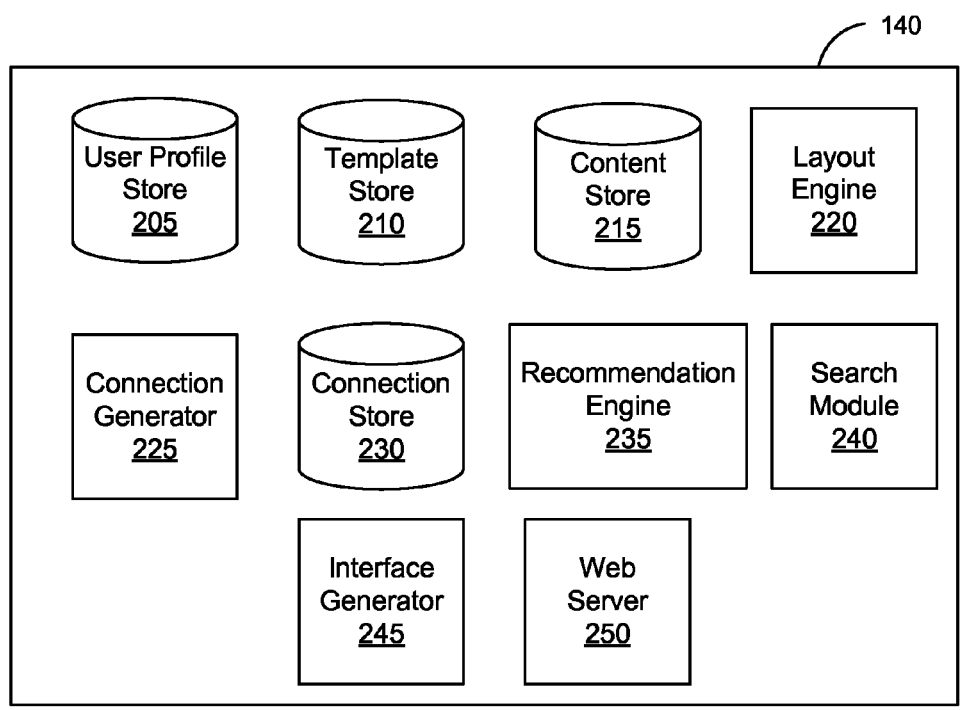
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represent various types of content. For example, the content store 215 stores content items received from one or more sources 110 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content store 215 along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

In some embodiments, the layout engine 220 also identifies portions of an image obtained from a source 110 or from the content store 215 that do not include content. For example, the image may be included in a content item or a content item itself may be the image. The image comprises a set of pixels, and the layout engine 220 identifies a portion of the image including a set of pixels that are within a threshold distance from a border or a feature of the image. A value is identified for various pixels within the region, where the value associated with a pixel within the portion identifies a color associated with the pixel. The layout engine 220 determines a measure of diversity of color within the portion based on the identified values associated with various pixels in the portion. In some embodiments, the measure of diversity of color specifies a difference between colors associated with various pixels within the portion. Alternatively, the measure of diversity identifies a color associated with the portion determined from the values associated with pixels within the portion. Based on the measure of diversity of color, the digital magazine server determines whether pixels in the portion are associated with a common color. For example, the measure of diversity of color is an average difference between values associated with pairs of pixels in the portion (e.g., pairs of adjacent pixels in the portion), and the layout engine 220 determines whether the measure of diversity of color exceeds a threshold value specifying a maximum difference between values. If the measure of diversity of color does not exceed the threshold value, the layout engine 220 determines the portion includes pixels having a common color, stores information indicating that the portion does not include content, and identifies an additional portion of the image within a threshold distance of the portion of the image. However, in the preceding example, if the measure of diversity of color exceeds the threshold value, the layout engine 220 stores information indicating the portion of the image includes content. Identification of a portion of an image that does not include content is further described below in conjunction with FIG. 4.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, a the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, JSON, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. In one embodiment, the digital magazine server 140 identifies a portion in an image that does not include content based on a measure of diversity of color associated with the portion of the image based on colors associated with pixels in the portion. For example, the layout engine 220 determines whether the portion of the image includes or does not include content based on the measure of diversity of color. In another embodiment, a digital magazine application executing on the client device 130 identifies the portion in the image without content based on the measure of diversity. Alternatively, the digital magazine server 140 and the client device 130 operate in conjunction with each other to identify a portion of the image that does not include content based on the measure of diversity of color for the portion. For example, certain functionality (e.g. identifying the portion of the image) is performed by the digital magazine server 140, while other functionality (e.g., presenting portions of the image including content) is performed by a digital magazine application executing on the client device 130.

Page Templates

Figure 3:
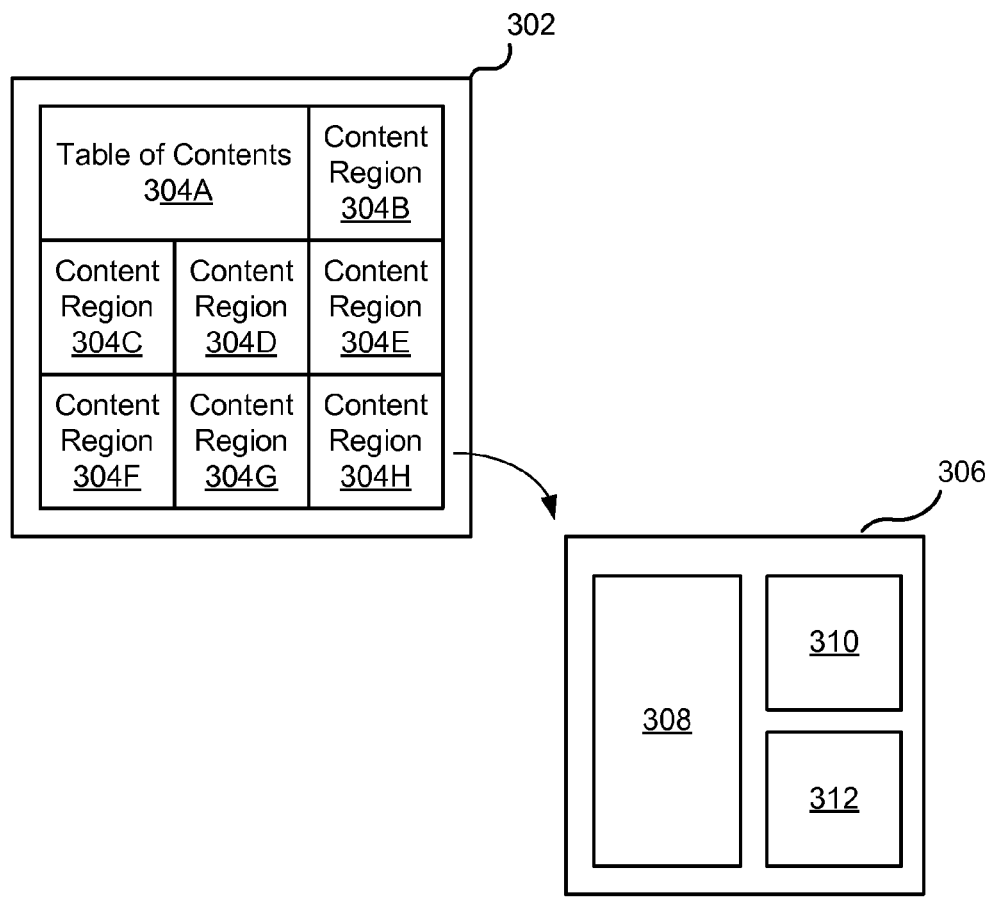
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.).

Hence, a subsection may include one or more subsections, allowing hierarchical organization and presentation of content items by a digital magazine.

Identifying a Portion of an Image that does not Include Content

Figure 4:
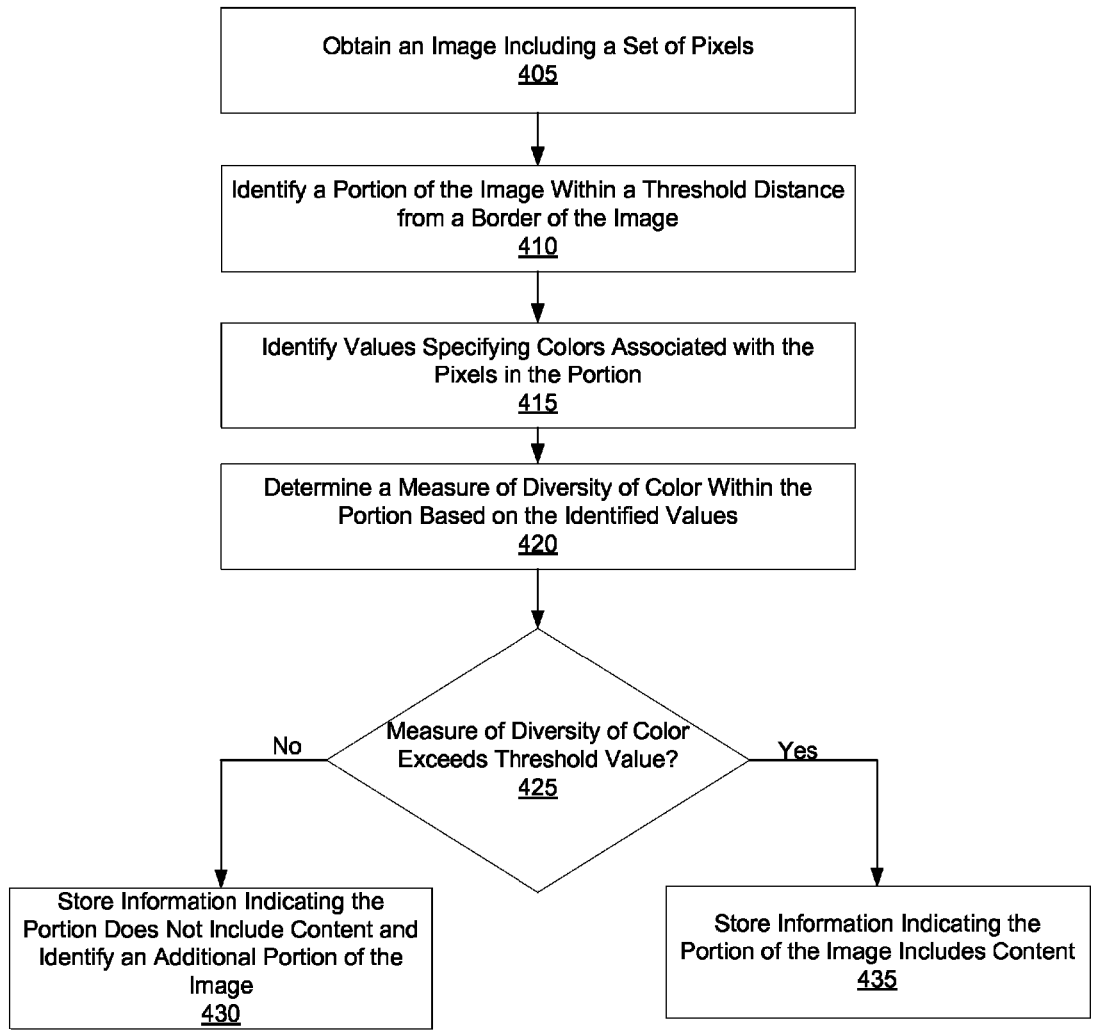
FIG. 4 is a flowchart of a method for identifying a portion of an image that does not include content, in accordance with an embodiment of the invention.

FIG. 4 is a flowchart of one embodiment of a method for identifying a portion of an image that does not include content. In other embodiments, the method may include different and/or additional steps than those shown in FIG. 4. The functionality described in conjunction with the digital magazine server 140 in FIG. 4 may be provided by the layout engine 220 in one embodiment or may be provided by any other suitable component, or components, in other embodiments. Alternatively, the client device 130 executes one or more instructions associated with the digital magazine server 140, such as an application associated with the digital magazine server 140, to provide the functionality described in conjunction with FIG. 4.

The digital magazine server 140 obtains 405 an image that includes a set of pixels. For example, the digital magazine server 140 obtains 405 an image from a source, from another user of the digital magazine server, or from the digital magazine server. A color model represents the image by associating one or more color components each specifying a color and color values specifying an intensity of the one or more colors specified by the color components with each pixel in the image. Example color models include: red-green-blue (RGB), cyan-magenta-yellow-black (CMYK), International Commission on Illumination cone response, luminosity, and blue stimulation (CIE XYZ), hue-saturation-value (HSV), hue-saturation-lightness (HSL), or any other suitable mathematical model representing color. For example, in an image represented using the RGB color model, each pixel is associated with three color components having color values representing intensity of red, green, and blue colors. As another example, in an image represented using the CMYK color model, each pixel is associated with four color components having color values representing intensity of cyan, magenta, yellow, and black colors.

A portion of the image within a threshold distance from a border of the image is identified 410 by the digital magazine server 140. One or more pixels from the set of pixels are included in the portion of the image. In some embodiments, the portion of the image is identified 410 so it includes at least at threshold number of pixels. The border of the image may be a boundary of the image; hence, an image includes multiple borders (e.g., an upper border, a lower border, a right border, and a left border). However, the digital magazine server 140 may identify 410 a portion of the image within a threshold distance of an edge included in the image, from a feature included in the image (e.g., an object, text, etc.), or from any suitable characteristic of the image in some embodiments. The threshold distance from the border (or from a feature or an edge) may be a number of pixels from the border, a number of pixels from the border at a specified angle, a number of pixels from the border in a specified direction (e.g. horizontal, vertical, diagonal), or any other suitable distance from the border. For example, if the threshold distance is ten pixels from an upper border perpendicular to the upper border, the identified portion of the image includes pixels within ten pixels between the upper border and a plane parallel to the upper border and separated from the upper border by ten pixels along an axis perpendicular to the upper border. In some embodiments, the digital magazine server 140 identifies 410 the portion so the portion includes at least a threshold number of pixels. The threshold number of pixels may be specified by one or more settings maintained by the digital magazine server 140. In some embodiments, the threshold number of pixels may be a percentage of a number of pixels included in the image.

The digital magazine server 140 identifies 415 values specifying one or more colors associated with one or more pixels included in the portion. For example, the digital magazine server 140 identifies 415 a value associated with each pixel included in the portion. In another embodiment, the digital magazine server 140 samples a subset of pixels included in the portion and identifies 415 a value associated with each pixel in the subset of the portion (e.g., the subset of pixels is determined by sampling every N pixels within the portion for computational efficiency or by pseudorandomly sampling pixels included in the portion). As described above, the image is represented using a color model that associates one or more color components as well as color values with each pixel in the image. In one embodiment, a value associated with a pixel in the portion is based on the color values and color components associated with the pixel by the color model associated with the image. For example, the identified value is a maximum color value from the color values associated with color components associated with the pixel or is a minimum color value from the color values associated with color components associated with the pixel. As another example, the identified value of a pixel is an average of the color values associated with the color components associated with the pixel. Alternatively, the value identified 415 for a pixel is a difference between a maximum color value associated with a color component and a minimum color value associated with a color component associated with the pixel or a difference between various color values associated with color components associated with the pixel. Alternatively, the value identified 415 for a pixel is one or more color values associated with the pixel satisfying one or more criteria (e.g., greater than a threshold value, less than a threshold value, equal to a value). In other embodiments, the value identified 415 for a pixel is based on the color values and color components associated with the pixel using any suitable relationship.

Based on the identified values for pixels within the portion of the image, the digital magazine server 140 determines 420 a measure of diversity of color within the portion of the image. The measure of diversity of color within the portion provides an indication of a number of different colors associated with pixels within the portion. In one embodiment, the measure of diversity of color within the portion is a variance of the identified values. Alternatively, the measure of diversity of color within the portion is an average difference between values identified 415 for different pairs of pixels within the portion (e.g., adjacent pixels) or another value based on differences between values identified 415 for various pixels within the portion. In another embodiment, the measure of diversity of color within the portion is an average of differences between values identified 415 for pixels within the portion and a specified value or is a difference between an average of the values identified 415 for pixels within the region and the specified value. For example, the measure of diversity is a difference between a minimum value identified 415 for a pixel within the region and a maximum value identified 415 for a pixel within the portion.

The digital magazine server 140 determines 425 whether the measure of diversity of color within the portion exceeds a threshold value. If the measure of diversity of color within the portion is an average difference between identified values associated with various pairs of pixels within the portion (e.g., adjacent pixels), the threshold value specifies a maximum difference between identified values; hence, if the measure of diversity of color is less than the maximum difference, pixels within the portion are determined to be associated with the same color or with similar colors. In this example, if the measure of diversity of color exceeds the maximum difference, the digital magazine server 140 determines the portion includes multiple colors, which indicates the portion includes content.

Responsive to determining 425 the measure of diversity of color does not exceed the threshold value, the digital magazine server 140 stores 430 information indicating the portion does not include content and identifies an additional portion of the image within the threshold distance from the portion of the image. The additional portion may be identified based on the threshold distance or based on an additional threshold distance from the portion of the image. If the measure of diversity of color does not exceed the threshold value, the values identified 415 for pixels in the portion indicate that the pixels in the portion have a common color or have colors within a threshold value of each other. A uniform color within the portion indicates the portion does not include content for presentation (e.g. the portion includes a border or frame).

The additional portion is identified as described above. For example, the portion is a row parallel to a border of the image and the additional portion is another row parallel to the row. In other embodiments, the additional portion is identified based on a threshold distance from an additional border or feature of the image. For example, the portion is a number of rows parallel to a border and an additional portion of the image within a threshold distance, or within an additional threshold distance, of another border of the image is identified. The additional portion of the image is analyzed as described above to determine whether the additional portion includes pixels having a common color. In some embodiments, the digital magazine server 140 identifies additional portions of the image that increase one or more dimensions of the identified portion of the image until one or more criteria are satisfied by the measure of diversity of color of an additional portion of the image. For example, the digital magazine server 140 stops identifying additional portions of the image when an additional portion of the image has a measure of diversity of color that equals a threshold value.

In one embodiment, the digital magazine server 140 stores 435 information associated with the image indicting the portion includes content if the measure of diversity of color exceeds the threshold value. Determining 425 the measure of diversity of color exceeds the threshold value indicates the portion includes pixels having various colors, which indicates the portion includes content of the image for presentation to the user. Alternatively, the digital magazine server 140 identifies an additional portion of the image as described above without storing information associated with the image in response to determining the measure of color diversity exceeds the threshold value.

When generating content for presentation to a user, the digital magazine server 140 may use information associated with the image identifying portions of the image that do not include content. For example, when identifying a slot of a page template for presenting the image, the digital magazine server 140 may use dimensions of the image including content rather than the dimensions of the image as a whole. This may improve presentation of the content included in the image when presented via the digital magazine. In some embodiments, the digital magazine server 140 determines dimensions of the image for selecting a slot within a page template by excluding portions of the image identified as not including content and including at least a number of pixels.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   obtaining an image for presentation to a user, the image comprising a set of pixels;

identifying a portion of the image within a threshold distance from a border of the image and including one or more pixels from the set of pixels;

identifying values specifying one or more colors associated with the one or more pixels included in the portion;

determining a measure of diversity of color within the portion based on the identified values;

determining whether the measure of diversity of color within the portion exceeds a threshold value; and responsive to determining the measure of diversity of color does not exceed the threshold value:

identifying, by a digital magazine server, an additional portion of the image within an additional threshold distance from the portion of the image; and storing information indicating the portion of the image does not include content.

2. The method of claim 1, further comprising:

responsive to determining the measure of diversity of color exceeds the threshold value, storing information indicating the portion of the image includes content.

3. The method of claim 1, wherein the portion of the image includes at least a threshold number of pixels.

4. The method of claim 1, wherein the threshold distance is a threshold number of pixels from the border.

5. The method of claim 1, wherein the threshold distance is a threshold number of pixels from the border in a specified direction.

6. The method of claim 1, wherein the threshold distance is a threshold number of pixels from the border at a specified angle.

7. The method of claim 1, wherein a value specifying one or more colors associated with a pixel in the portion is based on one or more color values associated with one or more color components of the pixel.

8. The method of claim 1, wherein the measure of diversity of color within the portion is an average difference between the identified values associated with pixels included in the portion and a specified value.

9. The method of claim 1, wherein the measure of diversity of color within the portion is based on differences between identified values associated with various pixels included in the portion.

10. The method of claim 9, wherein the measure of diversity of color within the portion is an average of the differences between identified values associated with pairs of adjacent pixels included in the portion.

11. The method of claim 1, further comprising:

identifying additional values identifying one or more colors associated with pixels included in the additional portion;

determining an additional measure of diversity of color within the additional portion based on the additional identified values;

determining whether the additional measure of diversity of color within the portion exceeds the threshold value; and responsive to determining the additional measure of diversity of color does not exceed the threshold value, identifying another portion of the image within the additional threshold distance from the additional portion of the image and storing information indicating the additional portion of the image does not include content.

12. The method of claim 1, wherein the additional portion includes at least a threshold number of pixels.

13. The method of claim 1, wherein the additional threshold distance is the threshold distance.

14. A computer program product comprising a non-transitory computer-readable storage medium having instructions encoded thereon that, when executed by a processor, cause the processor to:

obtain an image for presentation to a user, the image comprising a set of pixels;

identify a portion of the image within a threshold distance from a border of the image and including one or more pixels from the set of pixels;

identify values specifying one or more colors associated with the one or more pixels included in the portion;

determine a measure of diversity of color within the portion based on the identified values;

determine whether the measure of diversity of color within the portion exceeds a threshold value; and responsive to determining the measure of diversity of color does not exceed the threshold value, identify an additional portion of the image within an additional threshold distance from the portion of the image and store information indicating the portion of the image does not include content.

15. The computer program product of claim 14, wherein the computer readable storage medium further has instructions encoded thereon that, when executed by the processor, cause the processor to:

responsive to determining the measure of diversity of color exceeds the threshold value, store information indicating the portion of the image includes content.

16. The computer program product of claim 14, wherein the portion of the image includes at least a threshold number of pixels.

17. The computer program product of claim 14, wherein the threshold distance is a threshold number of pixels from the border.

18. The computer program product of claim 14, wherein the threshold distance is a threshold number of pixels from the border in a specified direction.

19. The computer program product of claim 14, wherein the threshold distance is a threshold number of pixels from the border at a specified angle.

20. The computer program product of claim 14, wherein the computer readable storage medium further has instructions encoded thereon that, when executed by the processor, cause the processor to:

identify additional values identifying one or more colors associated with pixels included in the additional portion;

determine an additional measure of diversity of color within the additional portion based on the additional identified values;

determine whether the additional measure of diversity of color within the additional portion exceeds the threshold value; and responsive to determining the additional measure of diversity of color does not exceed the threshold value, identify another portion of the image within the additional threshold distance from the additional portion of the image and store information indicating the additional portion of the image does not include content.

\* \* \* \* \*